Aug. 5, 1924.
O. MOORE
1,504,070
TROLLEY WHEEL
Filed April 27, 1923
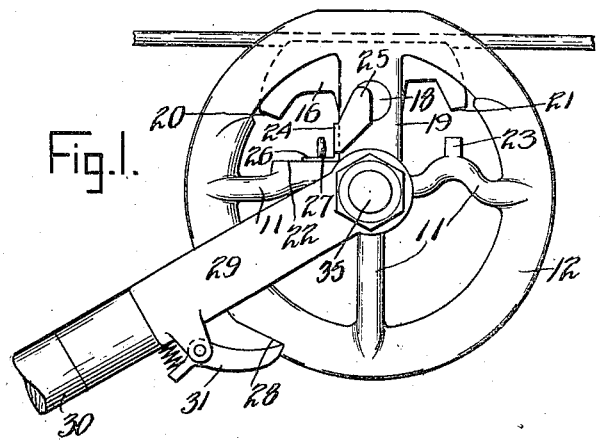
Fig. 1.
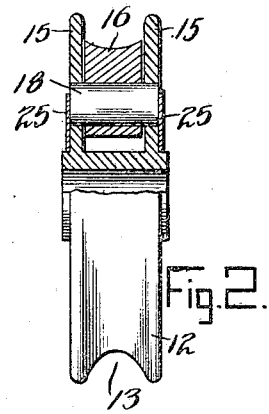
Fig. 2.
Fig. 3.
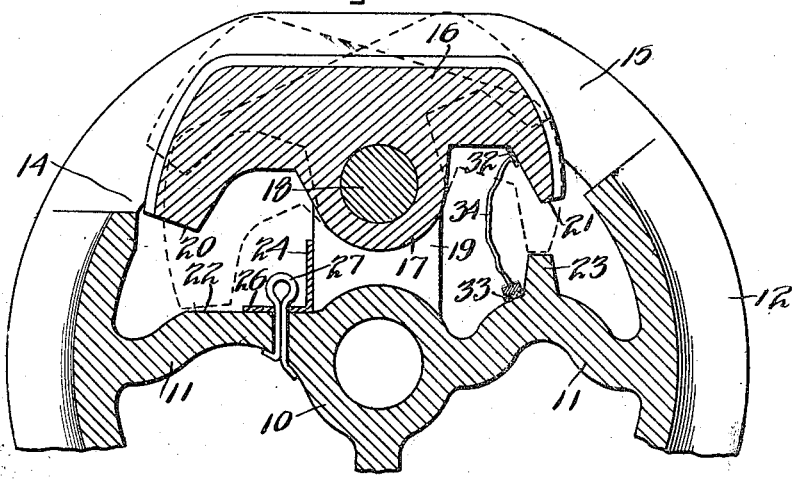
Fig. 4.
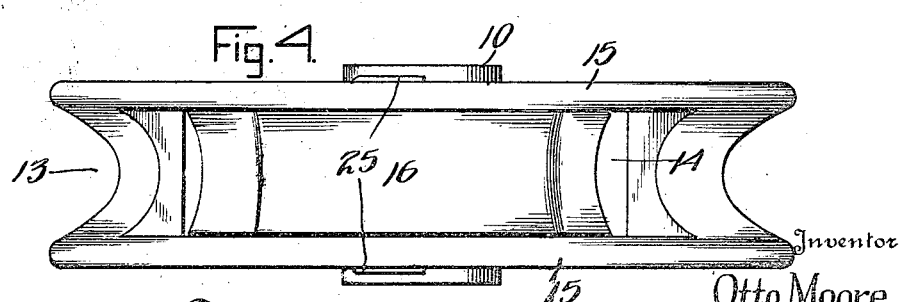
Fig. 5.
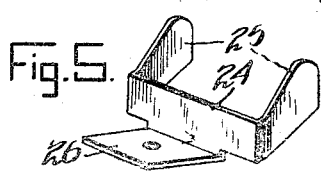
Inventor
Otto Moore.
By *[signature]*
Attorney Patented Aug. 5, 1924.

1,504,070

UNITED STATES PATENT OFFICE.

OTTO MOORE, OF INDIANAPOLIS, INDIANA, ASSIGNOR TO TROLLEY SHOE-WHEEL COMPANY, OF INDIANAPOLIS, INDIANA, A CORPORATION OF INDIANA.

TROLLEY WHEEL.

Application filed April 27, 1923. Serial No. 635,067.

*To all whom it may concern:*

Be it known that I, OTTO MOORE, a citizen of the United States, residing at Indianapolis, in the county of Marion and State of Indiana, have invented certain new and useful Improvements in Trolley Wheels, of which the following is a specification.

My said invention relates to improvements in trolley wheels and one of the objects of the invention is to provide a trolley wheel which will have a sliding contact with the wire, the construction being such that the part of the wheel having such sliding contact is readily removable and replaceable without the necessity of discarding other and unworn parts of the wheel.

Another object of my invention is to provide a trolley wheel having a sliding contact part which shall be so mounted that when the wheel is moved in one direction the wheel will be non-rotatable to present the sliding part for contact with the trolley wire, but when the wheel is moved in a reverse direction as, for instance, when the car carrying the trolley is backed, it will permit a free rotation of the wheel as a whole.

Still another object is to provide a wheel which shall always be in engagement with a considerable length of the wire, instead of having a mere point contact as usual.

Referring to the accompanying drawings, which are made a part hereof and on which similar reference characters indicate similar parts, Figure 1 is a side elevation of a wheel embodying my invention and mounted on a trolley harp;

Figure 2 is a front elevation partly in section of the wheel;

Figure 3 is a side elevation partly in section of the wheel;

Figure 4 is a plan view of the wheel showing the removable section in position, and Figure 5 is a perspective view of the retaining clip for the removable section.

In the embodiment of the invention illustrated the hub 10 has a plurality of bent radial arms 11 carrying at their extremities a wheel rim 12. This rim is provided with the usual groove 13 to receive the trolley wire. At one portion of the wheel the rim 12 is cut away to leave a recess 14 in the bottom of the groove 13 the walls 15 however being left intact. Mounted within this recess is an elongated shoe 16 which in cross section is grooved to receive the trolley wire and this shoe is provided with a hub 17 pivotally supported by a pin 18 carried by a pair of spaced apart spokes or arms 19 of the wheel which take the place of one of the arms 11, but differ therefrom in that they comprise two spaced parts made relatively wide for strength and to afford space for the pivot pin 18. The shoe 16 at each end is preferably provided with a pair of downwardly extending lugs 20 and 21, the front lug 20 being slightly heavier than the rear lug so that there will be a constant tendency when the shoe is free for it to tilt downward at its front end. The lug 20 also acts as a stop which abuts against the bent part 22 of the adjacent arm 11 or against a projection formed on said arm to limit the downward movement of the front end of the shoe so that the front part of that surface of the shoe having sliding engagement with the wire when the shoe is at the limit of its forwardly tilting movement will form substantially a continuation of the bottom of the groove of the trolley wheel at the rear of the shoe.

The lug 21 on the rear end of the shoe likewise engages a stop 23 formed on one of the arms 11 and similarly limits the downward movement of the rear end of the shoe.

The pin 18 is held in position between the two arms 19 by means of a U-shaped clip 24, the two arms 25 of which are adapted to embrace the arms 19 and the pivot pin 18 to prevent the pin from being displaced. This U-shaped clip is provided with a lip 26 which lies adjacent one of the arms 11 and is secured to the arm by means of a cotter pin 27.

The periphery of the rim 12 is provided at one point with a notch 28. The wheel is mounted between the bifurcated arms 29 of a trolley harp secured at the end of the trolley pole 30 and this harp carries a spring pressed or weighted pawl 31 arranged to engage the stop 28 to prevent the wheel from rotating when the car is traveling in a forward direction. At this time the shoe 16 is in sliding engagement with the trolley wire and due to the fact that the wheel is held against rotation this engagement will be maintained as long as the car is moved in a forward direction. Due to the fact that the shoe is pivoted between the two arms 19 it will adjust itself to a high or low wire or to a sagging wire so that the full length of the shoe will be maintained in contact with the wire, the position of the shoe when engaging a high wire being that shown in dotted lines with points 21 and 23 in engagement, while the dotted line position where the points 20 and 22 engage represents the extreme low position. The arc through which the shoe swings between these two extremes represents a wide range of positions for the trolley pole, or as much movement thereof as is ordinarily practicable. The stop 23 for the shoe allows the pole to stand almost straight up. Further rising would give rise to trouble due to the end of the rocker rising above the flanges of the wheel. When, however, the car is operated in a reverse direction, that is, when the car is backed up, the friction of the wire on the shoe will tend to rotate the entire wheel and the rear end of the shoe will tilt downwardly so that as the wheel is rotated the wire will ride in the groove of the wheel. By permitting the wheel to rotate when the car is moved in a reverse direction, thereby eliminating the greater part of the friction between the wire and the trolley, the tendency of the wheel under the influence of the pole spring to buckle the wire upwardly, is prevented.

The weighting of the rocker at one side is for the purpose of preventing damage as when the trolley passes a switch pan, the pan riding on the flanges of the trolley and the rocker tilting to the left so that the switch points can pass over the low side of the rocker and permit the same to be properly engaged by the wire. The same thing occurs at circuit-breakers and generally wherever such action is necessary to avoid tearing down any overhead construction.

The flanges 15 are flattened at the top at each side of the shoe 16 to avoid striking the hangers for the wire when the rocking shoe becomes worn. By my construction it will be seen that the shoe may be used for a long time e. g., until about half an inch in depth of the material of the shoe has been worn off.

The current in the construction so far described will pass through the shoe 16, the pin 18, arms 19, hub 10, and the pivot pin 35 of the harp and so to the trolley pole and to the motor on the car. In a preferred construction, however, I secure a copper terminal 32 to the shoe 16, and connect this by a braided wire conductor 34 to a terminal 33 on the right-hand arm 11. The terminal 33 on the conductor 34 has a dovetailed lower part fitting into a groove on the adjacent arm 11 but any other quickly detachable connection may be substituted therefor. With this construction the course of the current is more direct and it encounters less resistance, passing through the shoe to point 21, thence via conductor 34, arm 11 and hub 10 to pin 35. In this latter case the connections are relatively permanent except for the rocking engagement between the trolley wheel and its pivot pin, whereas in the other case there is another rocking engagement to be passed, viz, that between shoe 16 and its pivot pin 18. With the preferred construction it is possible also to oil the pivot 18 if desired.

It will be obvious to those skilled in the art that my invention may be modified in various ways and therefore I do not limit myself to the specific device shown in the drawings and described in the specification but only as indicated in the appended claims.

Having thus fully described my said invention, what I claim as new and desire to secure by Letters Patent, is:

1. A trolley wheel having a pivoted shoe forming a part of the rim of said wheel said shoe being arranged for sliding engagement with the trolley wire, substantially as set forth.

2. In a trolley wheel, a pair of radial arms, a removable shoe pivotally supported between said pair of arms said shoe having a wire engaging surface forming a continuation of the rim of the wheel, substantially as set forth.

3. A trolley wheel having a continuous circumferential trolley groove therein, the bottom of said groove being cut away along a segment of said circumference to form a recess, and a removable trolley shoe located in said recess, substantially as set forth.

4. A trolley wheel having an oscillatory shoe forming one segment of said wheel and adapted for sliding engagement with a trolley wire, substantially as set forth.

5. In a device of the character described, the combination with a trolley wheel having a pair of separated arms forming one of the spokes thereof and having a portion of the rim omitted, and a shoe pivotally and removably mounted between said arms and located within said omitted portion to form a continuation of the trolley wheel having sliding contact with the trolley wire, substantially as set forth.

6. In combination, a grooved trolley wheel, means to hold the same against rotation in one direction, and a renewable segmental shoe at the upper side of said wheel for engagement with the trolley wire, said shoe having a groove matching with the groove in the wheel, substantially as set forth.

7. In combination, a trolley wheel, means to hold the same against rotation in one direction, and a renewable shoe at the upper side of said wheel forming a part of the outer periphery of the wheel, said shoe having a flat upper face for sliding engagement with the trolley wire, substantially as set forth.

8. In combination, a trolley wheel, means to hold the same against rotation in one direction, a pivoted shoe at the upper side of said wheel, said shoe having a flat upper face for sliding engagement with the trolley wire, and the flanges of the wheel being flattened at the top, substantially as set forth.

9. In combination, a trolley wheel, means to hold the same against rotation in one direction, a pivoted shoe at the upper side of said wheel said shoe having a flat upper face for sliding engagement with the trolley wire the flanges of the wheel being flattened at the top, and means for limiting the pivotal movement of the shoe whereby in its extreme forward position its wire-engaging face forms a continuation of the groove of the trolley wheel, substantially as set forth.

10. In combination, a trolley wheel, means to hold the same against rotation in one direction, a pivoted shoe at the upper side of said wheel said shoe having a flat upper face for sliding engagement with the trolley wire the flanges of the wheel being flattened at the top, and means for limiting the pivotal movement of the shoe whereby in its extreme forward position its wire-engaging face forms a continuation of the groove of the trolley wheel said shoe being weighted at its front end, substantially as set forth.

11. In combination, a trolley wheel, means to hold the same against rotation in one direction, said wheel having a split spoke, a shoe mounted in said spoke with its outer face forming a part of the groove in the trolley wheel, and a pivot pin for said shoe in said spoke parallel to the axis of the wheel, substantially as set forth.

12. In combination, a trolley wheel, means to hold the same against rotation in one direction, said wheel having a split spoke, a shoe mounted in said spoke with its outer face forming a part of the groove in the trolley wheel, and a pivot pin for said shoe in said spoke parallel to the axis of the wheel said pin being freely rotatable relatively to said spoke and said shoe, substantially as set forth.

13. In combination, a trolley wheel, means to hold the same against rotation in one direction, said wheel having a split spoke, a shoe mounted in said spoke with its outer face forming a part of the groove in the trolley wheel, a pivot pin for said shoe in said spoke parallel to the axis of the wheel, and means for holding said pin in place comprising a bifurcated member straddling said spoke in position to engage the projecting ends of the pin, substantially as set forth.

14. In combination, a trolley wheel, means to hold the same against rotation in one direction, said wheel having a split spoke, a shoe mounted in said spoke with its outer face forming a part of the groove in the trolley wheel, a pivot pin for said shoe in said spoke parallel to the axis of the wheel, and means for holding said pin in place comprising a bifurcated member straddling said spoke in position to engage the projecting ends of the pin said member having a lip resting on another spoke of the wheel and detachably secured thereto, substantially as set forth.

15. In combination, a trolley wheel, means to hold the same against rotation in one direction, a pivoted shoe at the upper side of said wheel said shoe having a flat upper face for sliding engagement with the trolley wire, and a flexible conductor for electricity secured to said shoe and to a rigid part of the wheel, substantially as set forth.

In witness whereof, I have hereunto set my hand and seal at Indianapolis, Indiana this 18th day of April, A. D. nineteen hundred and twenty-three.

OTTO MOORE. [L. S.]

Witnesses:
 M. L. SHULER,
 O. S. BOLING.